Oct. 29, 1957 N. SAUNDERS 2,811,712
AIR RAID ALARM
Filed Dec. 2, 1954 3 Sheets-Sheet 1
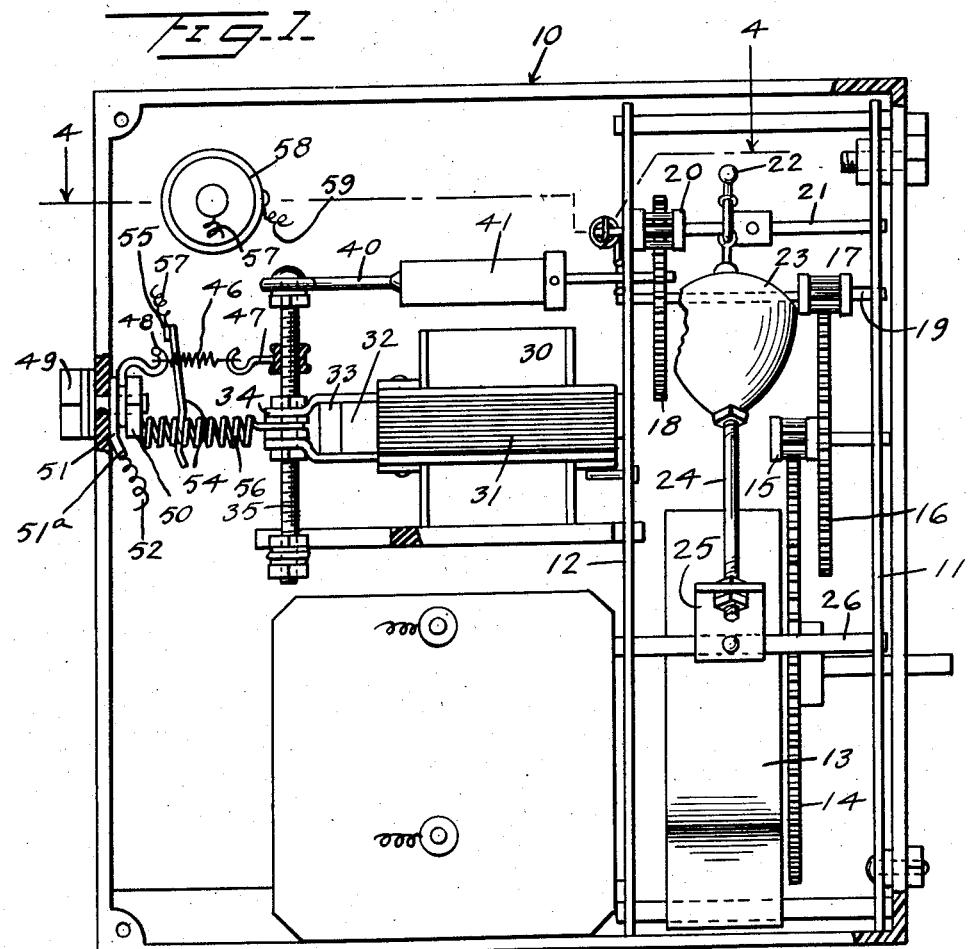
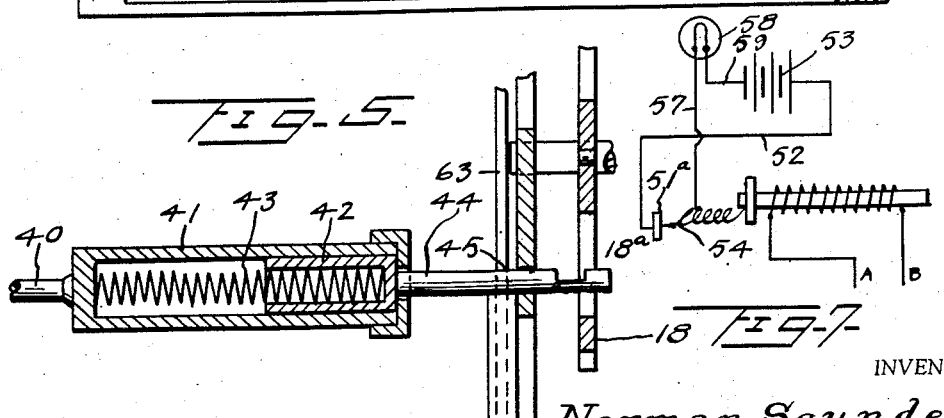
INVENTOR
Norman Saunders
BY Kimmel & Crowell
ATTORNEYS

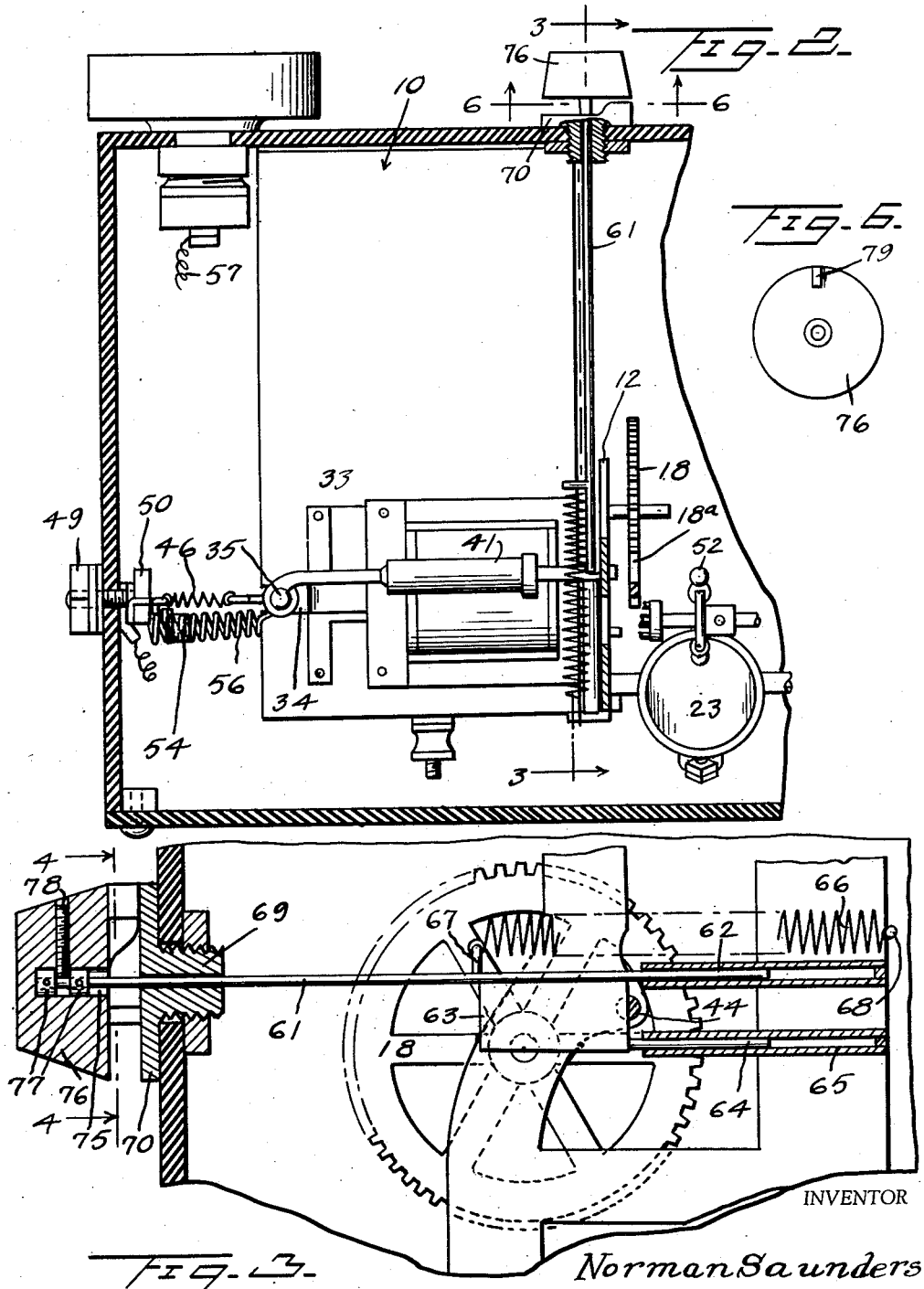

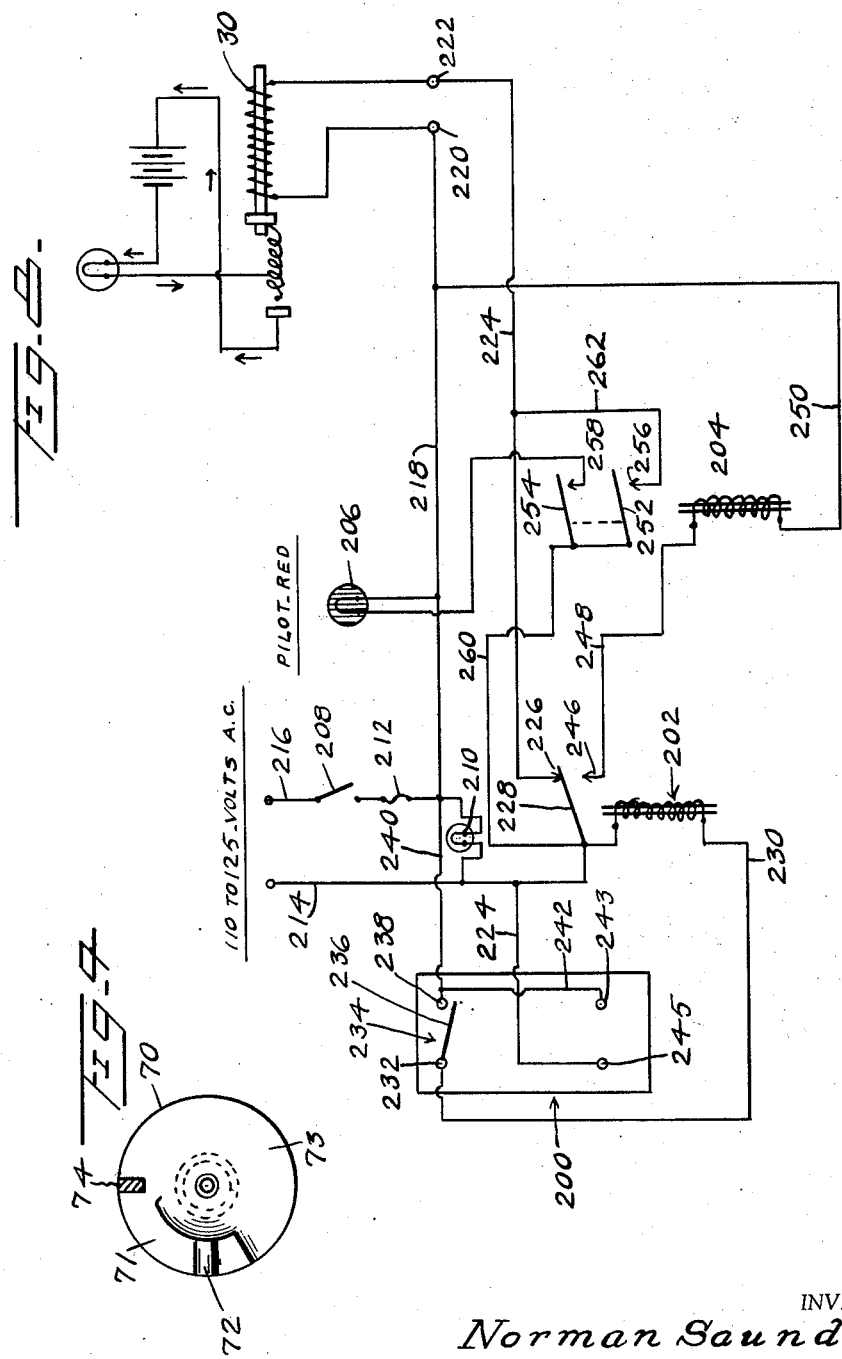

United States Patent Office 2,811,712
Patented Oct. 29, 1957

2,811,712
AIR RAID ALARM

Norman Saunders, Washington, D. C.

Application December 2, 1954, Serial No. 472,653

4 Claims. (Cl. 340—253)

This invention relates to an air raid alarm, and more specifically, to an individual air raid alarm device adapted to be installed in a dwelling or place of business, and which may be optionally controlled by means of a monitor mechanism, and comprises a continuation-in-part of my co-pending application, Serial No. 416,486, filed March 16, 1954, now Patent No. 2,781,507, entitled Air Raid Alarm.

One of the primary objects of this invention is to provide an improved air raid alarm comprising a bell or other signalling media which is adapted to be actuated by the discontinuance of the electric power supply in the building where the alarm is installed.

A further object of this invention is to provide in a device of the type referred to above, means which will indicate an accidental disruption of power such as may be occasioned by the failure of the central power station, the blowing of a fuse, or the like.

As conducive to a clearer understanding of this invention it may be here pointed out that in commercial localities, in some instances, arrangements have been made to provide an air raid indication by means of intermittent discontinuation of the electric power to effect, alternately, on and off conditions of equipment connected to the electric power lines. While this is generally satisfactory, in the event that an alarm should occur during the middle of the night when normally no lights or other equipment is on, no alarm would be transmitted by the power station.

Consequently, this invention has as a further object the provision of means whereby an audible signal will be actuated by such discontinuation of electric power, in order to awaken the sleeping household and indicate an air raid alarm. However, power failures may occur under accidental conditions and under such circumstances, in the absence of other provisions, the air raid alarm would be actuated thereby creating unnecessary alarm. The apparatus of the present invention is provided with a visual signal, preferably taking the form of an electric light or the like, which is alternately energized and de-energized in the case of a voluntary intermittent cutting on or off the electric power to indicate an air raid alert, and which is continuously illuminated in the event the power stays off for any appreciable length of time. Thus, the occupant may by merely looking at the alarm immediately determine whether an actual air raid alarm is being given which will be indicated by the continuous ringing of the audible alarm and the absence of the visual indication, or whether an accidental cutting off of the current has activated the audible alarm, in which case the visual indicator will be illuminated.

A still further important object of this invention is to provide a frequency actuated monitor for controlling an electrical and mechanical air raid alarm device.

This invention also contemplates the provision of means for providing a frequency actuated monitoring device pre-set for oscillation at a given frequency, the device being electrically connected with an electrical circuit for controlling electrical and mechanical alarm mechanisms.

A further object of this invention is to provide a frequency actuated monitoring device which has been preset for oscillation at a frequency lower than the frequency of the alternating current normally supplied by power companies to homes, factories, and other edifices occupied by one or more individuals whereby, by pre-arrangement with the power company, a reduction of the frequency normally supplied to the lines of the power company will effect an actuation of the monitoring device which in turn will energize an electrical circuit to place into operation electrical and mechanical alarm devices.

Other and further objects and advantages of the present invention will become more apparent from a consideration of the following specification when read in the light of the annexed drawings, in which:

Figure 1 is a rear elevational view of one form of device embodying features of the instant inventive concept.

Figure 2 is a fragmentary sectional view taken substantially along the line 2—2 of Figure 1 as viewed in the direction indicated by the arrows.

Figure 3 is an enlarged sectional view taken substantially along the line 3—3 of Figure 2 as viewed in the direction indicated by the arrows.

Figure 4 is a fragmentary sectional view taken substantially along the line 4—4 of Figure 3 as viewed in the direction indicated by the arrows.

Figure 5 is a sectional view taken substantially along the line 5—5 of Figure 2 as viewed in the direction indicated by the arrows.

Figure 6 is an enlarged sectional view taken substantially along the line 6—6 of Figure 2 as viewed in the direction indicated by the arrows.

Figure 7 is a schematic wiring diagram of the device to be controlled by a monitor.

Figure 8 is a schematic wiring diagram for the entire air raid alarm.

Referring now more specifically to the drawings, the device of the instant invention comprises a cabinet generally indicated by the reference numeral 10. The cabinet may be formed of plastic or other desired material and may be of any desired size.

Positioned within the cabinet is a fixed frame, including front and rear plates 11 and 12, respectively, within which is mounted a conventional clock mechanism including a main spring 13 which drives a gear train including a main drive gear 14, and a pinion 15 which drives the gear 16. The gear 16, in turn, meshes with a pinion 17 that drives a sprocket 18 through the shaft 19. The sprocket 18 meshes with a pinion 20 mounted on a rotatable shaft 21.

The shaft 21 carries a plurality of flexible clapper elements 22 which are adapted, when the clock mechanism is energized, to strike a bell 23 mounted on a support 24 carried by a bracket 25 secured to a transverse shaft 26, the latter comprising a portion of the frame structure.

From the foregoing, it will be seen that when the spring 13 is properly tensioned by winding, and the gear train released, in a manner to be more fully described hereinafter, the clapper 22 striking the bell 23 will occasion an audible alarm signal.

Means are provided for normally locking the clock mechanism against actuation as long as the electric current supplied to the house or other edifice is energized. This means takes the form of a solenoid coil 30 mounted in a frame 31 and having a core or armature 32 movable therein. The core 32 includes an exteriorly positioned cross-head 33 having an extension member 34. The extension member 34 carries a bolt or rod 35 which extends transversely with respect to the cross-head 33.

One end of the bolt 35 is connected to one end of a rod 40 having its other end secured to one end of an elongated substantially cylindrical element 41, the cylindrical element 41 having a plunger 42 mounted for reciprocation therein, and the latter is spring biased for movement toward the rear wall 12 of the clock mechanism frame by means of a spring 43. The plunger 42 has secured thereto a piston rod 44 which is notched at 45 adjacent the outer end thereof, see Figure 5.

The arrangement is such that when the solenoid is energized, the core 32 moves inwardly and thereby effects an inward movement of the cylindrical element 41 and the rod 44 to effect an engagement of the rod 44 between the sprocket spokes 18a of the sprocket 18 in the manner indicated in dotted lines in Figure 5. Upon deenergization of the solenoid 30, the core 32 moves outwardly under the pressure of the spring 46 having one of its ends secured to a hook-like element 47 mounted on the rod 35. The other end of the spring 46 is secured to a hook 48 which is secured to the cabinet 10 by means of the stud bolt 49 and lock nut 50. The outward movement of the core 32 will cause a corresponding movement of the cylindrical element 41 and its associated piston rod 44 effecting a release of the spokes 18a from the rod 44 whereupon the gear train is released to sound the audible alarm.

The hook-shaped member 48 forms a fixed switch contact which is electrically contacted by a washer 51 also mounted on the bolt 49 and is provided with a lug 51a. The lug 51a is connected by wire 52 to one side of a battery 53.

A movable switch terminal 54 is provided with a contact 55 at one end thereof and has its other end secured to a helicoidal spring 56, one end of the latter being secured to the rod 35, and the other end thereof secured to the stud bolt 49. The spring 56 acts as an arrester or shock cushioning member to the outward movement of the armature 32 under the influence of the tension spring 46 upon deenergization of the solenoid 30.

The contact 55 is connected by wire 57 with one side of an electric light 58. The other side of the light 58 connects through wire 59 with the other side of the battery 53.

Thus it is seen that upon failure of the line current, the solenoid 30 is deenergized and is moved outwardly under the tension of spring 46. The outward movement of the armature 32 carries with it the cylindrical element 41 and the piston rod 44 effecting disengagement of the piston rod 44 with the gear train of the clock motor mechanism and effects its actuation. Simultaneously therewith, the switch contact 55 engages against the fixed switch contact 48 closing the circuit to the light 58. Under such conditions both the visual and audible alarms are activated and the alarm device is indicating a condition of false alarm.

Means are provided for indicating a condition of true alarm. These means comprise a rod 61 having an end thereof extending into a tube or guide 62 carried by the rear wall 12 of the clock works mechanism. The rod 61 carries a slide member 63 to the lower portion of which is fixed a stud rod 64 engaging in a guide 65 secured to the rear wall 12 in parallel relation to the guide 62.

A spring 66 is connected at one end to a lug 67 carried by the rod 61 and has its other end secured to a pin 68 carried by the rear wall 12. Thus it is seen that the spring 66 normally serves to bias the slide member 63 into abutting relation with the rod 44. Thus, when the piston rod 44 is moved outwardly away from the back wall 12, the slide member 63 will be engaged within the notch 45 to preclude further movement of the piston rod in either direction.

The rod 61 has an end thereof which extends outwardly through a suitable fitting 69 in the front wall of the casing 10 and passes through the center of a cam member 70 having a high surface 71 including an indentation 72 and a low surface 73, see Figure 4. A stop member 74 is also provided. The outer end of the rod 61 seats in a bore 75 in a control knob 76 and is provided with a pair of collars 77 which are positioned on opposite sides of a set screw 78 extending through the knob.

The inner surface of the knob 76 is provided with a cam follower 79 (see Figure 6) which follows the contours of the cam 70. By virtue of the collar and pin arrangements previously described it will be readily apparent that the rod 61 is moved inwardly and outwardly in accordance with the position of the cam follower relative to the cam and that the position of the slide member 63 relative to the notch 45 is governed accordingly.

Assuming that the solenoid 30 has been connected with the power line through the lines A and B and is energized, the piston rod 44 will engage in the clock work mechanism and hold the same against actuation. At the same time the switch contacts 48 and 55 will be open and the electric light will not be illuminated. The power station upon pre-arrangement and upon receiving notice of an actual air raid alert, will operate the line control switches in such a manner as to intermittently discontinue the flow of current through the power lines. Upon the first breaking of the current, the solenoid 30 is deenergized and the rod 44 is withdrawn from the clock works mechanism to place the mechanical alarm in operation. Substantially simultaneously therewith the switch points 55 and 48 will make engagement with each other to establish a current through electric light 58. As the rod 44 is moved laterally away from the wall 12, the slide member 63, under tension of the spring 66, moves into engagement with the notch 45 locking the rod 44 against further movement in either direction. This action takes place while the cam follower 79 engages the low surface 73 of the cam 70.

As the power is restored to the lines, the solenoid 30 is again energized, and the armature 32 moves inwardly toward the wall 12. This breaks the switch contacts 48 and 55 to cut off the electric light 58. The armature 32 also effects movement of the rod 40 and the cylindrical element 41 which is telescoped over the now immovable plunger 42 of the piston rod 44 whereby the audible alarm continues in operation. Thus when the power light engineer again deenergizes the lines, the light 58 will again become illuminated, and upon subsequent energization of the lines the light 58 will go out. Consequently, during this period of intermittent illumination of the light 58, the clock works mechanism has been sounding a continuous audible alarm.

By way of comparison, the true alert is distinguished from the false alert in that during a true alert the electric light 58 is intermittently illuminated and the audible alarm continues in operation, whereas under a condition of a false alarm, the light 58 remains continuously illuminated and the audible alarm continues to sound.

By moving the cam follower 79 to the high side of the cam 70, the slide member 63 is retained in fixed position out of engagement with the rod 44 thereby rendering the alarm mechanism responsive to successive operation wherein the line current may be on or off numerous times, and wherein both the visual and audible alarms will be operated simultaneously.

A second embodiment of this invention involves an electronic monitor for energizing the solenoid 30. In this connection reference is made to Figure 8 of the drawings which illustrates a control circuit for the solenoid 30. The control circuit includes a power line frequency monitor 200 of the vibrating reed type, an electro-magnetic relay switch 202, an electro-magnetic time delay switch 204, a pilot light 206, a main switch 208, a pilot light 210, and a fuse 212. Any conventional reed type frequency responsive monitor available on the open market may be employed provided that its natural oscillation frequency is 59.5 cycles per second.

The wires 214, 216 connected at their outer ends with an outlet box disposed within a home, building, or other types of edifices, and the box (not shown) is connected with a public utility line carrying 110 to 125 volts and alternating current having a normal frequency of 60 cycles per second. The switch 208 is normally closed in order to place a voltage across the solenoid coil 30 to maintain the coil 30 in its normally energized condition. The circuit to maintain this normal condition is traced from the wire 216, switch 208, fuse 212, wire 218 to one side 220 of the solenoid coil 30. The other side 222 of the coil 30 is connected through wire 224 with a fixed contact 26 of the single pole double throw magnetic relay switch 202. The switch arm 228 is normally closed against the contact 226 and is connected through wire 214 to the other side of the power line. Thus it is seen that the solenoid 30 is energized.

The primary control of the energization of the solenoid 30 depends upon the condition of the winding of the electro-magnetic relay switch 202. As seen in the drawings, the relay switch 202 winding has one of its sides connected to wire 214 and the other side thereof connects through wire 230 to one side 232 of a normally open automatically actuated hold-down switch 234 which closes upon actuation of the monitor reed (not shown), and the switch 234 must be manually reset after having closed. The switch arm 236 is adapted to close against the fixed contact 238 which is connected with the other side of the line 216 through wire 240, fuse 212 and switch 208. Thus when the switch 234 is closed, the coil of the relay switch 202 is energized.

The winding (not shown) of the monitor 200 is energized through line 216, switch 208, fuse 212, wire 240, contact 238, and through wire 242 to one side of the monitor winding 243. The other side 245 of the monitor winding is connected through wire 244, to the other side of the line 214.

From the foregoing, it becomes clear that so long as the frequency of the alternating current in the power line is maintained at 60 cycles, the normal frequency therefor, the monitor remains unaffected and the solenoid coil 30 remains energized. However, when the frequency of the current through the power line has been reduced to 59.5 cycles by pre-arrangement with the power company upon receipt of a true air raid alert, the armature or reed is set into oscillation, and the switch arm 236 closes against and holds against the contact 238. This energizes the magnetic relay switch 202 to cause the switch arm 228 to move out of engagement with the contact 226 thereby breaking the circuit to the solenoid coil 30.

Under these conditions, the audible alarm will sound and the visual alarm will be continuously illuminated. To distinguish between this false alarm condition and a true alert, an additional circuit is included to make the differentiation.

As the relay switch 202 is energized, switch arm 228 makes engagement with the fixed contact 246 which is connected through wire 248 with one side of the winding of the time delay relay 204. The other side of the time delay relay 204 connects through wire 250 with the wire 218. Thus the time delay relay 204 is energized through the line 214, switch arm 228, contact 246, wire 248 to the switch 204, from the switch 204, the wires 250 and 218, fuse 212 and switch 208 to the other side of the line 216, and is operated to close the switch arms 252, 254 against their respective fixed contacts 256 and 258. Assuming that the lines 214, 216 are still energized, the solenoid coil 30 is reenergized through the line 214, wire 260, the switch arm 252, fixed contact 256, wire 262, wire 224, to one side of the solenoid coil 30. The other side of the solenoid coil connects back through to the other side of the line 216 through the wire 218.

From the foregoing, it is now clear that under conditions of false alarm, that is, when no voltage exists across the lines 214, 216 the magnetic relay switch 202 and the time delay relay switch 204, as well as the solenoid coil 30 will be deenergized. With no voltage across the coil 30, the audible alarm and the visual alarm will be maintained in constant operation. However, upon the occasion of a false alert through a power line failure or the opening of a circuit breaker, for example, the magnetic relay 202 will be instantaneously actuated and will be followed within approximately one second with the actuation of the time delay relay 204. The energization of the time delay relay restores the voltage across the coil 30 rendering the visual alarm inoperative while maintaining the audible alarm in continuous operation.

The pilot light 206 is adapted to indicate the closure of the relay switch 204. This is accomplished through a circuit that includes wire 264 which has one of its ends connected with the line 216 through the wire 218. The other end of the wire 264 is connected with one side of the pilot light 206, and the latter has its other side connected with the fixed contact 258 which is adapted to be engaged by switch arm 254 upon energization of the time delay relay switch 204. The arm 254 connects through wire 260 with the other side of the line 214.

The pilot light 210 is utilized to indicate power on the lines 214, 216 and is connected between the line 214 and one side of the fuse 212.

In either of the modifications of this alarm device, after the device has signaled either a false or true alarm and with the slide member 63 locked in the notch 45, the operator must grasp the knob 76 and pull it away from the front wall to disconnect the slide member 63 from the notch 45 in order to reset the alarm. Additionally, the auomatic hold-down switch 234 must be manually reset by opening the switch arm 236 to remove the line voltage across the relay switch 202 whereby the switch arm 228 reengages the contact 226. This must be done when the frequency monitoring device is employed.

Having described and illustrated two embodiments of this invention, it is to be understood that the same are offered merely by way of example, and that the invention is to be limited only by the scope of the appended claims.

What is claimed is:

1. An air raid alarm to be actuated by a variation of frequency in power lines, comprising, audible alarm means, visual signal means, means including a battery in circuit with said signal means for actuating both said alarm means and said signal means, electro-magnetic relay means controlling said actuating means whereby deenergization of said relay means causes said actuating means to actuate both said alarm and signal means, and subsequent reenerization of said relay means causes said actuating means to deactivate only said signal means with said alarm means being maintained, a supply circuit to said relay means and connectible with the power lines, said supply circuit including the switch arm and one contact of a double pole electro-magnetic relay, a by-pass circuit connected with said supply circuit in bridging relation to said relay switch and including the switch of a time delay relay, a time delay circuit between the other contact of said double pole relay and said supply circuit and including the coil of said time delay relay, a power line frequency monitor, an input circuit between said supply circuit and said monitor, and an output circuit between said supply circuit and said monitor and including a normally open monitor switch and the coil of said double pole relay, whereby a variation in frequency of the current fed said supply circuit from the power lines will activate said monitor to close said monitor switch and energize said double pole relay and break said supply circuit to said relay means and deenergize the latter to cause said actuating means to actuate both said alarm and signal means to indicate a change in power supply, energization of said double pole relay closing said time delay circuit to energize said time delay relay and thereby close said by-pass circuit and reenergize said relay means to cause said actuating means to deactivate said signal means while said alarm means is mintained and thereby indicate a true alert in contrast to continued actuation of said signal means to indicate a power failure.

2. An air raid alarm according to claim 1 wherein said monitor is of the vibrating reed type.

3. An air raid alarm according to claim 2 wherein said time delay relay includes a second switch in said by-pass circuit and a contact for said switch, and a signal circuit between said latter contact and said supply circuit and including a pilot signal to indicate actuation of said time delay relay and a true alert.

4. An air raid alarm according to claim 3 comprising a pilot light bridged across said supply circuit to indicate normal current supply thereto.

References Cited in the file of this patent
UNITED STATES PATENTS

| | | |
|---|---|---|
| 1,158,146 | Olney | Oct. 26, 1915 |
| 1,469,946 | Morrison | Oct. 9, 1923 |
| 2,420,232 | Deal | May 6, 1946 |
| 2,609,431 | Faltz | Sept. 2, 1952 |
| 2,632,887 | Rusnak | Mar. 24, 1953 |
| 2,705,791 | Merancy | Apr. 5, 1955 |